United States Patent
Noguchi

(10) Patent No.: US 7,586,527 B2
(45) Date of Patent: Sep. 8, 2009

(54) DETECTING SMEAR LEAKAGE IN AN IMAGE SENSOR EXPOSED TO A BRIGHT LIGHT SOURCE

(75) Inventor: Yasunori Noguchi, Sunnyvale, CA (US)

(73) Assignee: Mediatek USA Inc, San Jose, CA (US)

( * ) Notice: Subject to any disclaimer, the term of this patent is extended or adjusted under 35 U.S.C. 154(b) by 763 days.

(21) Appl. No.: 11/031,710

(22) Filed: Jan. 7, 2005

(65) Prior Publication Data
US 2006/0152607 A1 Jul. 13, 2006

(51) Int. Cl.
*H04N 9/64* (2006.01)

(52) U.S. Cl. ............................ 348/248; 348/243

(58) Field of Classification Search ............ 348/207.99, 348/241, 245, 248, 249, 313, 231.2, 243
See application file for complete search history.

(56) References Cited

U.S. PATENT DOCUMENTS

| | | | | |
|---|---|---|---|---|
| 4,448,510 | A | 5/1984 | Murakoshi | 354/289.12 |
| 5,598,246 | A | 1/1997 | Miyamoto et al. | 396/55 |
| 6,091,448 | A | 7/2000 | Washisu et al. | 348/208 |
| 6,222,538 | B1 | 4/2001 | Anderson | 345/336 |
| 6,809,763 | B1 * | 10/2004 | Yoshida | 348/248 |
| 6,970,193 | B1 * | 11/2005 | Kidono et al. | 348/245 |
| 6,970,198 | B1 * | 11/2005 | Schinner et al. | 348/333.01 |
| 7,038,724 | B2 | 5/2006 | Satoh et al. | 348/333.05 |
| 7,113,203 | B1 * | 9/2006 | Wu et al. | 348/207.99 |
| 7,218,351 | B2 * | 5/2007 | Miyahara et al. | 348/313 |
| 7,289,146 | B2 * | 10/2007 | Saigusa et al. | 348/248 |
| 7,379,091 | B2 | 5/2008 | Yost et al. | 348/208.1 |
| 2002/0003579 | A1 | 1/2002 | Inagaki | 348/312 |
| 2003/0095197 | A1 | 5/2003 | Wheeler et al. | 348/241 |
| 2003/0107662 | A1 | 6/2003 | Suzuki | 348/249 |
| 2003/0151674 | A1 | 8/2003 | Lin | 348/222.1 |
| 2004/0189837 | A1 | 9/2004 | Kido | 348/241 |
| 2004/0196503 | A1 | 10/2004 | Kurtenbach et al. | 358/1.18 |
| 2004/0263628 | A1 | 12/2004 | Ambiru et al. | 348/207.1 |
| 2005/0094004 | A1 * | 5/2005 | Gotanda | 348/241 |
| 2005/0117031 | A1 * | 6/2005 | Russon et al. | 348/231.2 |
| 2005/0264661 | A1 * | 12/2005 | Kawanishi et al. | 348/248 |

FOREIGN PATENT DOCUMENTS

JP   2003-304454 A   4/2002

* cited by examiner

*Primary Examiner*—Lin Ye
*Assistant Examiner*—Dennis Hogue
(74) *Attorney, Agent, or Firm*—Imperium Patent Works; Zheng Jin

(57) ABSTRACT

Smear detect circuitry within an analog front end (AFE) of a digital camera determines when black area pixel values received from an image sensor are indicative of smear leakage. Smear leakage can cause a light vertical line in the resulting digital image. When a sensor that is coupled to a storage element is exposed to a bright light source, storage element overload can cause a leakage charge to leak from the storage element to other storage elements along a transfer line. Smear detect circuitry identifies the transfer line exhibiting smear leakage and excludes pixel values from storage elements along that transfer line from the calculation of a black level value used to calibrate color pixel values. The digital camera displays a smear icon indicating smear leakage in a digital image that is to be taken. A digital file of the digital image includes a header with a smear detect field.

21 Claims, 7 Drawing Sheets

DETECTING SMEAR LEAKAGE IN AN IMAGE SENSOR EXPOSED TO A BRIGHT LIGHT SOURCE

TECHNICAL FIELD

The present invention relates to digital imaging and, in particular, to detecting smear leakage that results when an image sensor is exposed to a bright light source.

BACKGROUND

When a digital photograph is taken of an image that includes a bright light source, a light vertical line often appears in the digital image. The light vertical line results from "smear" leakage caused by the bright light source. The bright light source can cause smear leakage from an overloaded storage element to an adjacent storage element of an image sensor in a digital camera. FIG. 1 illustrates a digital image 10 that includes a light vertical line 11 caused by smear leakage. In this example, the smear leakage is due to the bright light source of the sun in the real-world image that was photographed. In addition to light vertical line 11, the colors in digital image 10 may also not accurately reflect the colors in the real-world image because the bright light source affects the black level calibration used to correlate digital pixel data to specific colors. For example, the tree in the original photographed image of FIG. 1 may appear in digital image 10 as blue instead of green.

An apparatus is sought for detecting and indicating the presence of smear leakage in an image sensor. An apparatus is also sought that reduces the smear-induced deviation of colors in a digital image from the true colors in the corresponding real-world image.

SUMMARY

The black level calibrator of an analog front end (AFE) integrated circuit of a digital camera includes smear detect circuitry. The smear detect circuitry determines when black area pixel values received from an image sensor of the digital camera are indicative of smear leakage. The black area pixel values are obtained from storage elements in an optical black area of the image sensor that is not exposed to light. Smear leakage causes a light vertical line in the digital image output by the digital camera. Smear leakage occurs in the image sensor when a sensor that is coupled to a storage element is exposed to a bright light source. The bright light source can result in storage element overload that causes a leakage charge to leak from the storage element to other storage elements along a transfer line. Smear leakage can even leak to storage elements in the optical black area and hamper the calculation of the black level value used to calibrate color pixel values. Using an incorrect black level value to calibrate color pixel values can result in a digital image with "crazy" colors.

A state machine in the smear detect circuitry distinguishes multiple, consecutive black area pixel values that exceed a predetermined threshold from other black area pixel values that occasionally exceed the threshold. Multiple, consecutive pixel values from the optical black area that exceed the threshold are indicative of smear leakage along a transfer line into the optical black area. In one embodiment, the smear detect circuitry identifies the transfer line that exhibits smear leakage and excludes pixel values from storage elements along that transfer line from the calculation of the black level value.

In another embodiment, only black area pixel values that exceed the threshold are excluded from the calculation of the black level value.

In another embodiment, the digital camera displays a smear icon indicating storage element overload and smear leakage in a digital image that is to be taken or that has been taken. In an embodiment where the pixel data that is corrupted by smear leakage is not used, the smear icon warns the photographer to take another picture. Where the corrupted pixel data is used, the smear icon indicates that the resulting digital image contains smear noise. The digital image is then stored in the digital camera as a digital file. The digital file includes a header with a smear detect field. A bit in the smear detect field indicates whether the digital image exhibits storage element overload. In addition, a code may be included in the filename assigned to the digital file containing the digital image that exhibits smear leakage.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
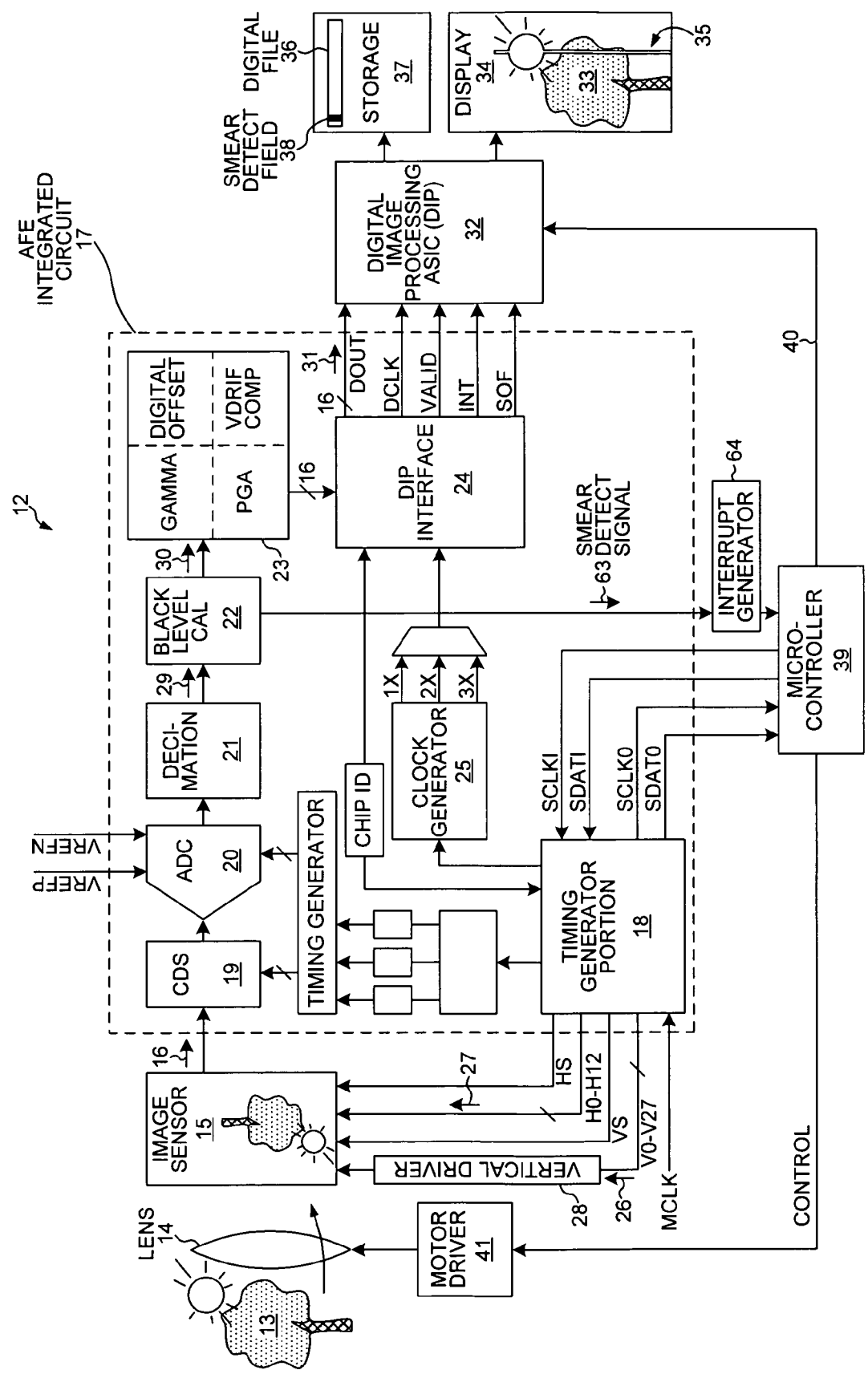
FIG. 2 is a simplified, schematic diagram of an analog front end of a digital camera with a black level calibrator according to an embodiment of the invention.

FIG. 2 is a simplified diagram of a high-resolution digital camera 12 that exhibits storage element overload and smear leakage. In an example of the operation of digital camera 12, a photographer points digital camera 12 at a real-world image 13 that is to be photographed. Image 13 contains a source of bright light, the sun in this example. Image 13 passes through a lens 14 and is captured by an image sensor 15. Image sensor 15 outputs analog pixel data 16 that includes pixel values corresponding to charge in individual storage elements of image sensor 15. An analog front end (AFE) integrated circuit 17 receives the analog pixel data 16 from image sensor 15.

AFE integrated circuit 17 includes a timing generator portion 18, a correlated double sampling (CDS) mechanism 19, an analog-to-digital converter (ADC) 20, a decimation circuit 21, a black level calibrator 22, a signal processing block 23, a digital image processing (DIP) interface 24 and a clock generator 25. Timing generator portion 18 supplies vertical pulse signals 26 and horizontal pulse signals 27 to image sensor 15 in order to read out analog pixel data 16. Image sensor 15 requires the voltage minimums and voltage maximums of vertical pulse signals 26 to extend outside the voltage range that can be supplied by AFE integrated circuit 17. Vertical pulse signals 26 output from AFE integrated circuit 17 are therefore supplied to a vertical driver 28 that performs level shifting to the voltage levels required by image sensor 15.

CDS 19 receives analog pixel data 16 from image sensor 15. Each pixel value of analog pixel data 16 is typically in the form of a pair of analog level signals. The first analog level signal indicates the unique reference voltage level of the particular pixel, and the second analog level signal indicates the color brightness level of the pixel. CDS 19 determines the analog signal magnitude between the reference level and the brightness level. ADC 20 digitizes analog signal magnitude and outputs the digital result, which is received by decimation circuit 21. Decimation circuit 21 outputs decimated, digitized pixel data 29, which is received by black level calibrator 22. Black level calibrator 22 determines a black level calibration value of decimated, digitized pixel data 29 using pixel data from sensors of image sensor 15 that are not exposed to light. Black level calibrator 22 then calibrates AFE 17 by subtracting the calibration value from the pixel values of pixel data 29 to generate calibrated, decimated and digitized pixel data 30. Black level calibrator 22 then passes the calibrated, decimated and digitized pixel data 30 to signal processing block 23 and on to DIP interface 24. DIP interface 24 then outputs digitized image data 31 to a digital image processing (DIP) ASIC 32.

DIP ASIC 32 performs image processing on digitized image data 31 and then typically causes a digital image 33 to be displayed on a display 34 of digital camera 12. In the example of FIG. 2, smear leakage occurs between storage elements of image sensor 15 as real-world image 13 is captured. Smear leakage within image sensor 15 is manifested as a light vertical line 35 in digital image 33. DIP ASIC 32 also stores digital image 33 as a digital file 36 on a storage medium 37 within digital camera 12. Digital file 36 may, for example, be a jpg file. The presence of smear in digital image 33 is indicated by a smear detect field 38 in the header of digital file 36. A microcontroller 39 provides overall key scanning, control and configuration functions for digital camera 12. Microcontroller 39 is coupled to DIP ASIC 32 via a control bus 40. Microcontroller 39 controls lens 14 via motor driver circuitry 41.

Figure 1:
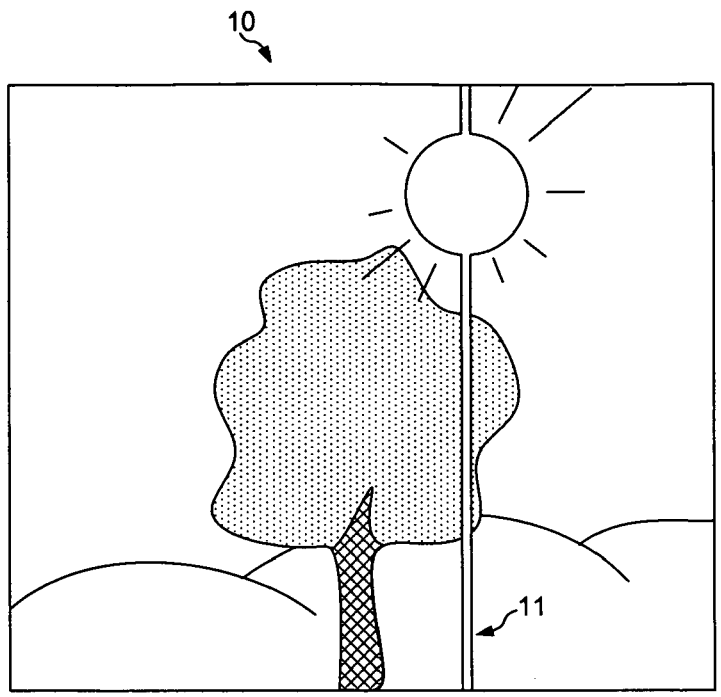
FIG. 1 is a digital image containing a light vertical line caused by smear leakage.
Figure 3:
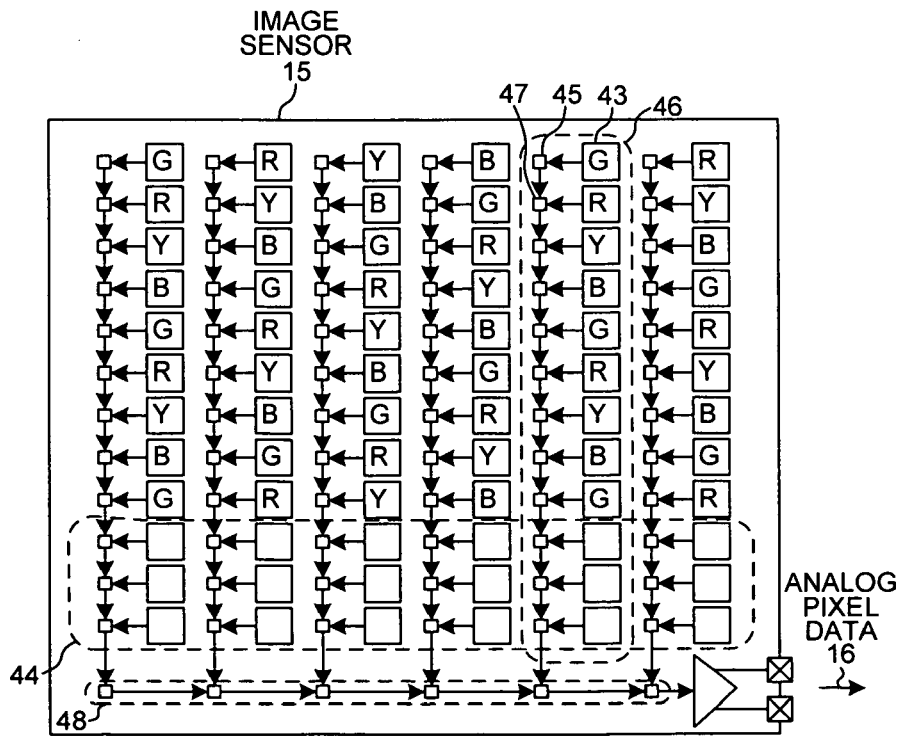
FIG. 3 is a simplified, schematic diagram of an image sensor with an optical black area.

FIG. 3 shows image sensor 15 of digital camera 12 in more detail. Image sensor 15 may, for example, be a charge coupled device (CCD) sensor, a CMOS sensor, another type of pixilated metal oxide semiconductor sensor or another type of image sensor. In this example, image sensor 15 is a CCD sensor with a two-dimensional array of sensors. In the illustration, the sensors are denoted as squares, where each square contains a letter. A square that contains a "G" is a sensor for green. A square that contains an "R" is a sensor for red. A square that contains a "B" is a sensor for blue. A square that contains a "Y" is a sensor for a fourth color, such as yellow. Reference numeral 43 identifies one such sensor for green. In one embodiment, the sensors for all of the colors have the same structure. The various sensors are covered by filters that allow only the appropriately colored light to reach each sensor. In this example, sensors in the bottom three rows are not designated as colored. These bottom rows of sensors fall within an optical black area 44 of image sensor 15. The bottom rows of sensors are actually at the top of the captured image because lens 14 inverts the image. Sensors within optical black area 44 are typically covered such that they are not exposed to light.

In response to a shutter signal, each of the sensors of image sensor 15 takes a sample of light. The sample is retained in the sensor in the form of a charge. The magnitude of the charge indicates the sample value. The charge values are read out of image sensor 15 in serial fashion as a sequence of pixel values by supplying vertical pulse signals 26 and horizontal pulse signals 27 to switches within image sensor 15. In the example of FIG. 3, each sensor has an associated storage element located to its left. Reference numeral 45 identifies the storage element for sensor 43. At one time, the sample charges from all the sensors are transferred right to left into the associated storage elements. A vertical pulse signal is then applied to switches associated with columns of storage elements. This causes the sample charge in each storage element to be shifted down to the storage element below it. Reference numeral 46 identifies a column of sensors and associated storage elements, including sensor 43 and storage element 45. For example, the sample charge in storage element 45 is shifted down to a storage element 47 below it in column 46. In a similar manner, the sample charge is shifted down the entire column 46.

The sample charge in the bottom-most row of storage elements passes into a readout row 48 of storage elements at the bottom of image sensor 15. Readout row 48 is a horizontal transfer line. Once readout row 48 contains a set of charges, a plurality of horizontal pulse signals 27 is applied to switches associated with readout row 48. These horizontal pulses cause the sample charges in the storage elements of readout row 48 to be shifted out of image sensor 15 one-by-one. When the complete row of sample charges has been shifted out of image sensor 15, then another vertical pulse is applied in order to load readout row 48 with the next row of sample charges to be read out. This process of supplying a vertical pulse, and then shifting out the bottom row of sample charges is repeated until all the sample charges are read out of image sensor 15.

Figure 4:
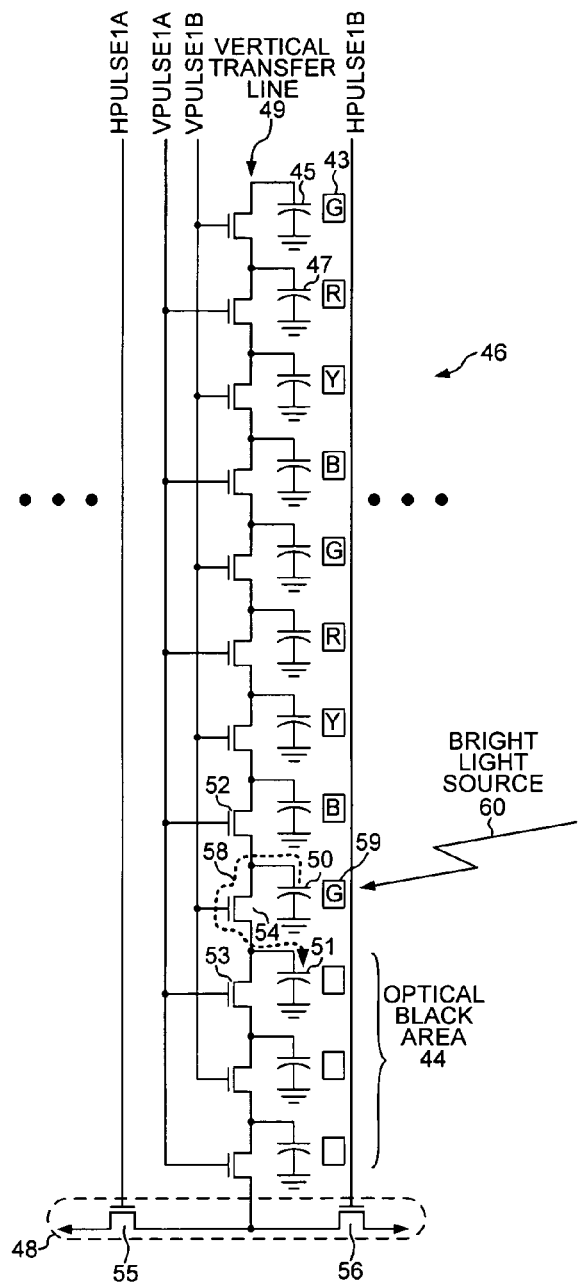
FIG. 4 is a more detailed diagram of storage elements, sensors and a vertical transfer line of the image sensor of FIG. 3.

FIG. 4 shows column 46 of image sensor 15 in more detail and illustrates an operation of column 46. Column 46 includes a vertical transfer line 49 with two alternating sets of switches. In one embodiment, vertical transfer line 49 is an analog shift register. To transfer a charge from a storage element 50 to a storage element 51, switches 52 and 53 are kept open and a switch 54 is closed. This allows charge from storage element 50 to pass through conductive switch 54 along vertical transfer line 49 and into storage element 51. It is therefore seen that adjacent switches in column 46 are opened and closed in alternating fashion to shift a sample charge down vertical transfer line 49. In one embodiment, storage element 50 is a semiconductor depletion capacitor formed from a field effect transistor. Switch 54 is also formed from a field effect transistor manufactured in the same process as is storage element 50. Although FIG. 4 is a very simplified diagram of a vertical transfer bus, more complex configurations of vertical transfer busses operate in an analogous manner. For example, in another embodiment, both the storage and switching functions are implemented by charge coupled devices (CCDs). Charge is transferred from a first CCD to a second CCD in response to a pulse signal by lowering the bias voltage of the second CCD lower than the bias voltage of the first CCD.

Figure 5:
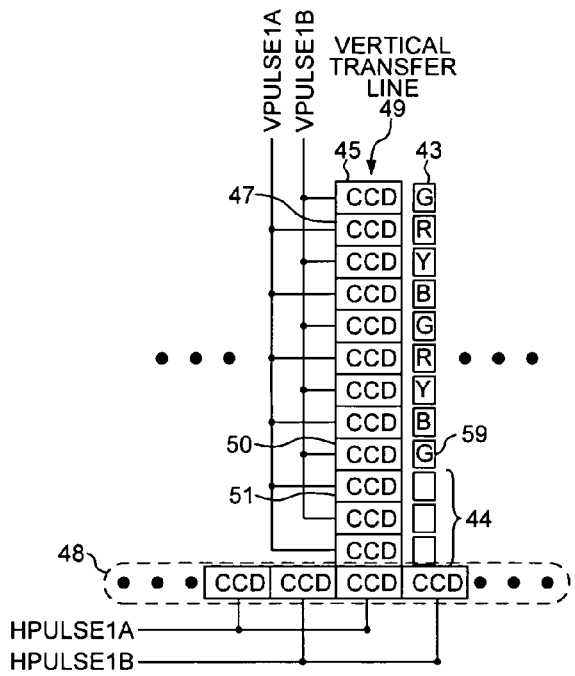
FIG. 5 is a diagram of a vertical transfer line of the image sensor of FIG. 3 in which charge coupled devices implement both storage and switching functions.

FIG. 5 shows column 46 of image sensor 15 in which both the storage and switching functions are implemented by charge coupled devices (CCDs). In the embodiment of FIG. 5, vertical transfer line 49 is a row of CCDs.

Figure 6:
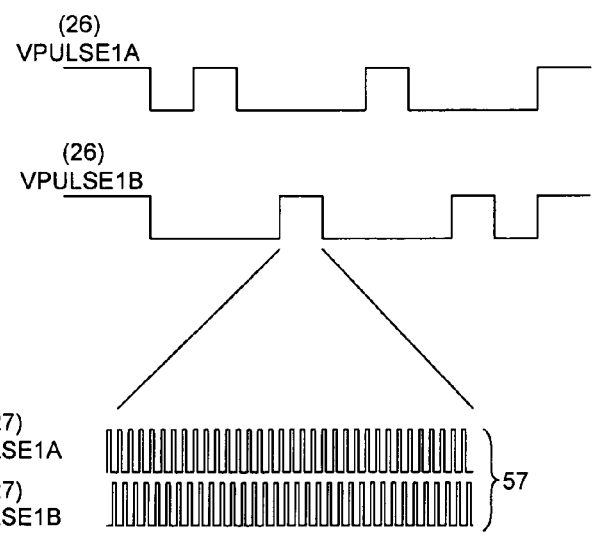
FIG. 6 is a waveform diagram illustrating the pulse signals used for switching along the transfer lines of FIG. 4.

FIG. 6 is a waveform diagram that illustrates vertical pulse signals 26 and horizontal pulse signals 27 used to read analog pixel data 16 out of the sensor array of image sensor 15. FIG. 6 shows the alternating fashion of pulses in two vertical pulse signals VPULSE1A and VPULSE1B that control the two alternating sets of switches of FIG. 4, including switches 52, 53 and 54. FIG. 6 also shows two horizontal pulse signals HPULSE1A and HPULSE1B that control the switches associated with readout row 48, including a switch 55 and a switch 56. After vertical pulse signals 26 shift a row of sample charges into readout row 48, a complete set 57 of horizontal shift pulses of horizontal pulse signals HPUSEL1A and HPULSE1B shifts the sample charges out of readout row 48. The process repeats with each vertical shift being followed by a set 57 of horizontal shift pulses.

The state of the art in CCD image sensors has advanced well beyond the simple examples set forth in FIGS. 4-6. CCD image sensors typically have multiple modes including, for example, a high frame rate readout mode, a frame readout mode (also called the capture mode), an autoexposure mode and an autofocus mode. As a result, more complex timing signals are often required to drive contemporary CCD sensors than the signals shown in FIG. 6. The high frame rate readout mode may, for example, be used in a hybrid camera when the hybrid camera is used to capture video, whereas the higher resolution capture mode may be used when the hybrid camera is used to take still pictures. For example, the higher resolution capture mode typically allows the sensors to be exposed to the real-world image longer than in the autofocus mode.

Smear leakage results when charge from one storage element leaks to another storage element. For example, a leakage charge can leak from one storage element to an adjacent storage element along a vertical transfer line even though a pulse signal has not closed the switch between the two storage elements. Returning to FIG. 4, a leakage charge 58 leaks from storage element 50 along vertical transfer line 49 into storage element 51 even though switch 54 has not been closed in response to vertical pulse signal VPULSE1B. One cause of leakage charge 58 is an excessive charge buildup across storage element 50 that results when a sensor 59 adjacent to storage element 50 is exposed to a bright light source 60. When a large charge builds up across the semiconductor depletion capacitor of storage element 50, the depletion area around storage element 50 may push charge as far as switch 54, allowing switch 54 to become conductive. Leakage charge 58 may then leak along vertical transfer line 49 to adjacent storage elements in a cascading fashion. In this manner, all of the storage elements coupled to a vertical transfer line may become highly charged although only a few of the associated sensors were exposed to the bright light source. Storage element overload may also result in charge leaking from one storage element directly to an adjacent storage element without passing through a switch or along a transfer line.

Figure 7:
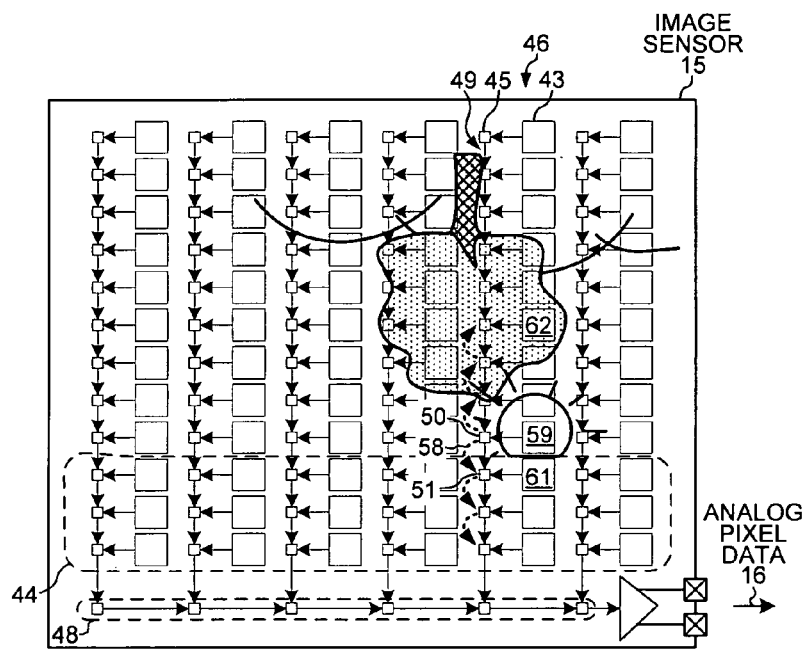
FIG. 7 is a simplified, schematic diagram of the image sensor of FIG. 3 being exposed to an image with a bright light source.

FIG. 7 illustrates the bright light source of the sun in image 13 being focused by lens 14 onto sensor 59 of image sensor 15. Excessive charge builds up across the capacitor of storage element 50 resulting in storage element overload. Leakage charge 58 leaks onto adjacent storage elements and storage elements that are coupled to vertical transfer line 49. Although a sensor 61 is within optical black area 44 and is not exposed to any light, storage element 51, which is associated with sensor 61, is highly charged. Similarly, although the light source from image 13 is less intense (darker) at a sensor 62, the storage element associated with sensor 62 is also highly charged. Analog pixel data 16 output by image sensor 15 results in the digital image 33 of FIG. 2 if digital camera 12 does not correct for the storage element overload. Digital image 33 has light vertical line 35 running through the darker area of the tree in image 13. Light vertical line 35 may be several vertical transfer lines wide where the bright light source also overloads the sensors to the right and left of sensor 59 and thereby charges the storage elements coupled to those vertical transfer lines in a cascading fashion.

Smear leakage can reduce the quality of digital image 33 in two ways: first, by producing light vertical line 35 and second, by producing "crazy" colors. Smear leakage can incorrectly increase the black level used to interpret color data in the decimated, digitized pixel data 29. Where an incorrect average black level is subtracted from pixel data 29, DIP ASIC 32 interprets the color data incorrectly. Digital image 33 then appears with "crazy" colors. For example, the sky in digital image 33 might be green, and the tree might be orange.

Digital camera 12 uses black level calibrator 22 to correct for these two problems. The photographer may not wish to have light vertical line 35 in digital image 33 because the vertical line was not in original image 13. Smear leakage may not be apparent to the photographer looking at a digital image on display 34 in a faster viewfind mode, such as the autofocus or autoexposure modes. The exposure time in those modes is typically shorter, and there is less time for a bright light source to overfill storage elements. In modes with shorter exposure periods, it is less likely that leakage charge will cascade to other storage elements along a vertical transfer line. In the viewfind mode, for example, storage element overload may result in a shorter and less pronounced smear line.

If black level calibrator 22 detects smear leakage, digital camera 12 can reduce the aperture (F stop) to reduce smear leakage in the next frame of analog pixel data 16. For example, where digital camera 12 is in the autoexposure mode, black level calibrator 22 detects smear and transmits a smear detect signal 63 to an interrupt generator 64 that interrupts microcontroller 39. Digital camera 12 then recaptures real-world image 13 a second time with a reduced aperture. Storage element overload is less likely to occur in the second exposure with a smaller aperture. Pixel values obtained from the first exposure that caused storage element overload are not used to generate digital image 33. This procedure can be repeated iteratively until an aperture is used that does not result in smear leakage.

When digital camera 12 is not in a viewfind mode, the photographer is warned that digital image 33 contained smear leakage so that the photographer can retake the picture. The photographer may then point the camera away from the bright light source. For example, even where a beach scene might result in an overexposed digital image, the photographer can nevertheless avoid storage element overload and the resulting light vertical line by not including the sun in the picture. In some cases, the photographer may wish to retain vertical line 35 as a visual effect. For example, an underexposed candlelight dinner scene may have light vertical lines through the flames of the candles. Digital images with vertical lines can be given a smear indication in the filename of the jpg file under which they are stored in storage medium 36. The photographer can then later identify which digital images contain the smear visual effect. In addition, digital files containing images with smear also include a smear indication in their file headers. For example, a bit in smear detect field 38 indicates that the digital image contained in digital file 36 exhibits storage element overload.

Figure 8A:
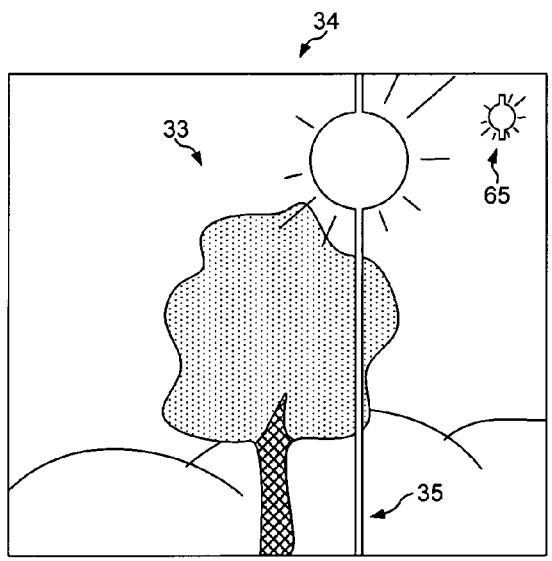
FIGS. 8A-B show a smear icon on an on-screen display of the digital camera of FIG. 2.
Figure 8B:
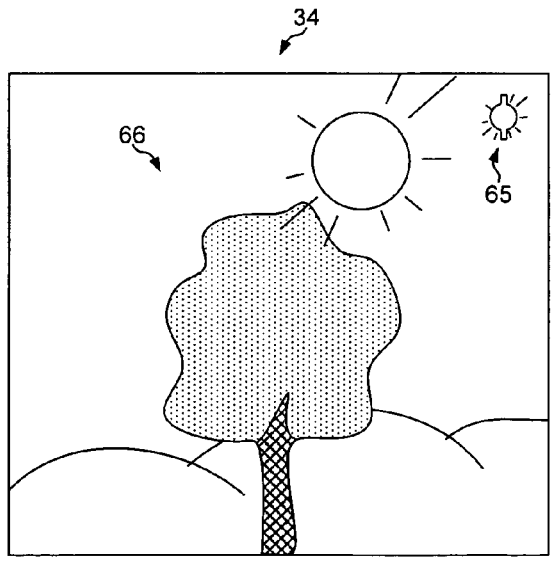

FIGS. 8A-B show a smear icon 65 on display 34 of digital camera 12. Digital camera 12 displays smear icon 65 when black level calibrator 22 detects smear leakage. When microcontroller 39 is interrupted in response to smear detect signal 63 being asserted, microcontroller 39 activates on-screen display logic that causes smear icon 65 to be superimposed on the image being displayed on display 34. In FIG. 8A, for example, smear icon 65 is superimposed onto digital image 33 that includes light vertical line 35. Smear icon 65 indicates that light vertical line 35 resulted from smear leakage and not, for example, from the sun being reflected at a vertical angle from lens 14 of digital camera 12. In FIG. 8B, smear icon 65 appears on display 34 in the viewfind mode before the photographer captures digital image 33. The appearance of smear icon 65 in a viewfind image 66 on display 34 warns the photographer that taking a picture with the selected aperture and shutter settings will result in a digital image exhibiting smear leakage.

Figure 9:
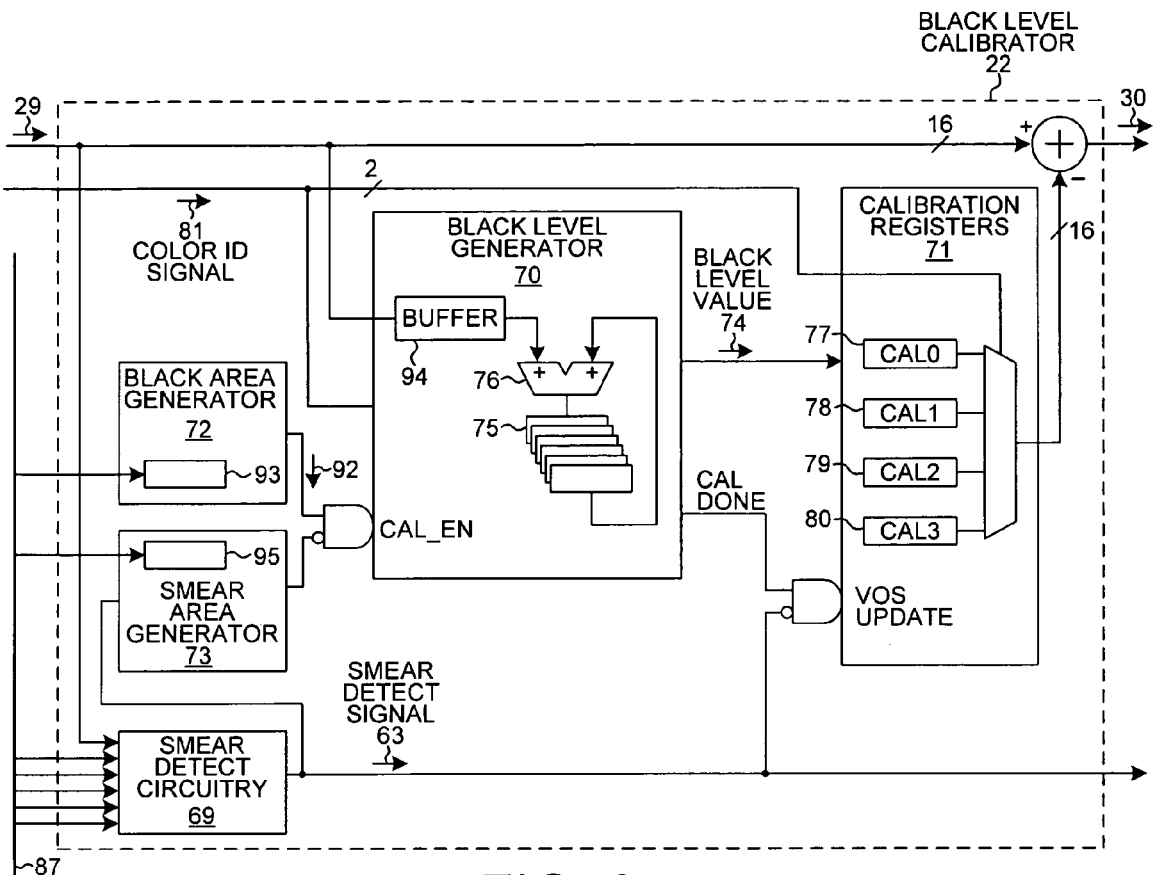
FIG. 9 is a more detailed diagram of the black level calibrator of FIG. 2 including smear detect circuitry.

FIG. 9 is a simplified block diagram of black level calibrator 22 that correctly calibrates the black level value even from analog pixel data 16 that contains storage element overload. Black level calibrator 22 includes smear detect circuitry 69, a black level generator 70, calibration registers 71, a black area generator 72 and a smear area generator 73. Decimation circuit 21 outputs decimated, digitized pixel data 29, which is received by smear detect circuitry 69 and by black level generator 70. In this embodiment, pixel data 29 is sixteen bits wide. Black level generator 70 calibrates AFE integrated circuit 17 by outputting a black level value 74 that is an average of black area pixel values not affected by smear leakage. The averaging function is performed by registers 75 and an adder 76. In other embodiments, black level value 74 is a weighted average, an interpolated value or some other value derived from black area pixel values. Smear detect circuitry 69 determines which black area pixel values of analog pixel data 16 correspond to storage elements influenced by smear leakage. Upon detecting smear leakage, smear detect circuitry 69 outputs smear detect signal 63 that disables black level generator 70 such that some or all black area pixel values influenced by smear leakage are not included in the running average calculation of black level value 74. Reference values 77-80 that are based on black level value 74 are stored in calibration registers 71. One of reference values 77-80 is derived for each color of sensor in image sensor 15. For example, registers CAL0, CAL1, CAL2 and CAL3 may contain reference values for red, green, blue and yellow sensors, respectively. When black level calibrator 22 receives pixel values that are not black area pixel values, the reference values 77-80 are subtracted from the pixel value from the correspondingly colored sensor. calibration registers 71 receive a color ID signal 81 that identifies the color to which each pixel value of pixel data 29 corresponds. By excluding pixel values that are affected by storage element overload from the black level calibration, the reference values 77-80 are more accurate, and DIP ASIC 32 is less likely to interpret a pixel value of calibrated pixel data 30 as an inaccurate color.

Figure 10:
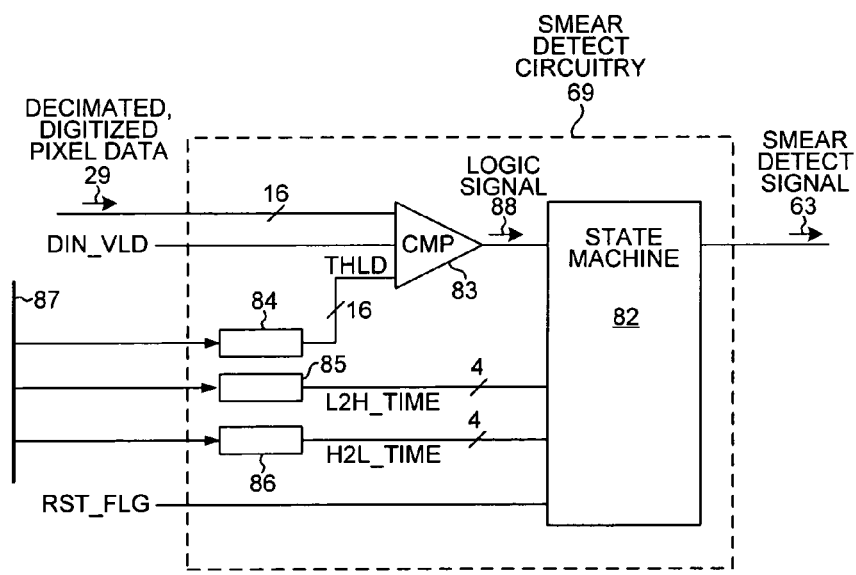
FIG. 10 is a more detailed diagram of the smear detect circuitry of FIG. 9 including a state machine.

FIG. 10 shows smear detect circuitry 69 of black level calibrator 22 in more detail. Smear detect circuitry 69 includes a state machine 82, a comparator 83 and three registers 84-86. Comparator 83 receives each 16-bit value of decimated, digitized pixel data 29 on sixteen input leads. In another embodiment, decimation circuit 21 is disabled, and comparator 83 receives digitized pixel data with the same sampling point as used by ADC 20. In addition, comparator 83 receives a 16-bit threshold value (THLD) on an additional set of sixteen input leads from register 84. The threshold value (THLD) is written to register 84 by microcontroller 39 over a data bus 87. Comparator 83 also receives a valid-data-in signal (DIN_VLD) that is deasserted when a pixel value of pixel data 29 corresponds to a defective sensor or storage element and to a storage element outside of optical black area 44. Thus, comparator 83 outputs a logic signal 88 that is a digital low for all pixel values corresponding to storage elements outside of optical black area 44.

Logic signal 88 is a digital high when a pixel value of pixel data 29 is greater than threshold value (THLD). Threshold value (THLD) is programmable to correspond to a usual charge magnitude from a storage element associated with a sensor that is not exposed to light in optical black area 44. A pixel value from optical black area 44 might nevertheless exceed threshold value (THLD) for a number of reasons. For example, a defective sensor might overcharge a storage element and result in a pixel value that is too high. Heat may also increase a pixel value. A pixel value from a storage element in optical black area 44, however, may also be increased by a leakage charge from a storage element outside optical black area 44. To distinguish high pixel values that result from storage element overload from other high pixel values that result from defective pixels and other causes, smear detect circuitry 69 employs state machine 82.

State machine 82 transitions from a normal condition to a smear condition when pixel data 29 exceeds threshold value (THLD) for longer than a first time period. State machine 82 asserts smear detect signal 63 in the smear condition. The state machine 82 transitions back to the normal condition when pixel data 29 falls below threshold value (THLD) for longer than a second time period. Two 4-bit reference values that are written to registers 85 and 86 define the first time period and the second time period, respectively. A reset signal (RST_FLG) returns state machine 82 to the normal condition before pixel values from each subsequent transfer line are analyzed.

Figure 11:
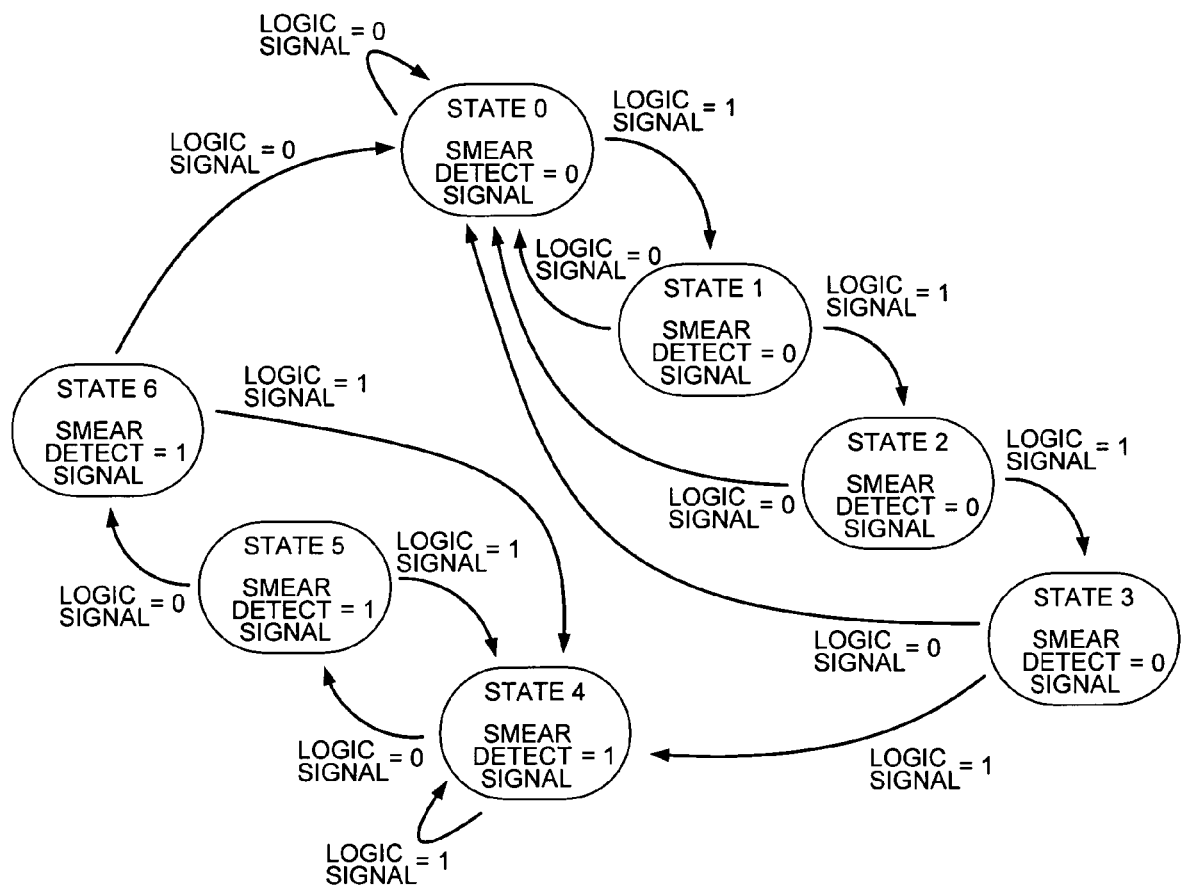
FIG. 11 is a diagram illustrating the transitions between states of the state machine of FIG. 10.

FIG. 11 illustrates the possible transitions between states of state machine 82. State machine 82 is in the normal condition in states 0, 1, 2 and 3 and in the smear condition in states 4, 5 and 6. Reset signal (RST_FLG) returns state machine 82 to state 0 before smear detect circuitry 69 analyzes a sequence of pixel values associated with each additional transfer line of image sensor 15. In this example, state machine 82 transitions from state 0 to state 4, and from the normal condition to the smear condition, when logic signal 88 remains high for four consecutive pixel values of pixel data 29. Thus, the 4-bit reference value (L2H_TIME) that is written to register 85 is 0100. If logic signal 88 goes low before it remains high for four consecutive pixel values, then state machine 82 is returned to state 0. State machine 82 is returned from the smear condition to state 0 when logic signal 88 remains low for three consecutive pixel values. Thus, the 4-bit reference value (H2L_TIME) that is written to register 86 is 0011.

Figure 12:
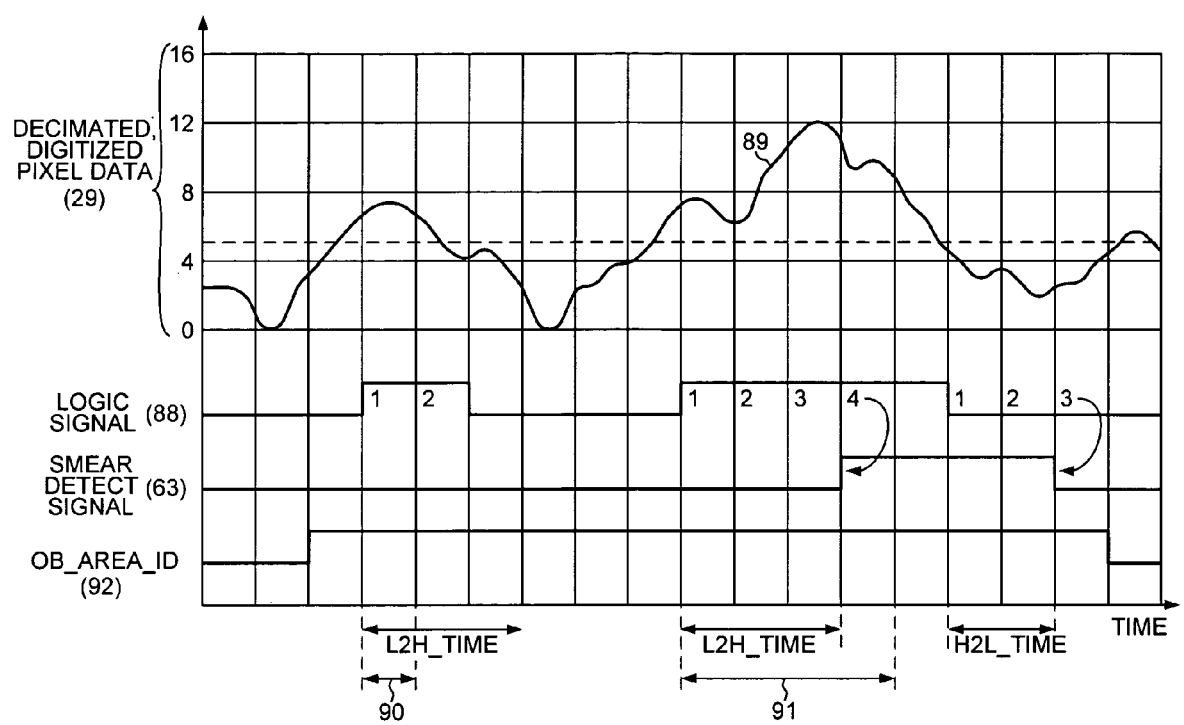
FIG. 12 is a waveform diagram illustrating the operation of the smear detect circuitry of FIG. 9.

FIG. 12 is a waveform diagram illustrating the operation of state machine 82. FIG. 12 shows that state machine 82 does not assert smear detect signal 63 when a sequence of black area pixel values 89 of pixel data 29 exceeds threshold value (THLD) over a period 90 of two pixel values. Smear detect signal 63 is, however, asserted when sequence of black area pixel values 89 exceeds threshold value (THLD) over a period 91 that extends over at least four pixel values. Smear detect signal 63 is then deasserted when sequence of black area pixel values 89 falls below threshold value (THLD) over three consecutive pixel values. FIG. 12 also shows an optical black area ID signal (OB_AREA_ID) 92.

Black area generator 72 generates optical black area ID signal 92, which is asserted for those pixel values that correspond to storage elements within optical black area 44. Returning to FIG. 9, a register 93 within black area generator 72 is programmable to identify the storage elements of each transfer line that lie within optical black area 44. For example, optical black area 44 in FIG. 7 is the first three storage elements of each transfer line after readout row 48. In other embodiments, the optical black area can be the last N storage elements at the top of the image sensor. The black area can even be at the side of the image sensor if the readout line runs vertically along one side of the image sensor. Black level generator 70 is enabled and includes pixel values in the calibration calculation only when black area ID signal 92 is asserted and smear detect signal 63 is deasserted.

FIG. 12 shows that smear detect signal 63 is asserted only after four consecutive pixel values of sequence of black area pixel values 89 have exceeded threshold value (THLD). Although the subsequent pixel values that exceed threshold value (THLD) are excluded from the calculation to determine black level value 74, those four pixel values may nevertheless also skew the calculation of black level value 74. A buffer 94 (as shown in FIG. 9) in black level generator 70 stores several pixel values of sequence of black area pixel values 89 and allows the determination of black level value 74 to be performed with a delay of several pixel values. In this manner, several previous pixel values (for example, four) can be excluded from the calculation of black level value 74 after smear detect signal 63 is asserted.

In another embodiment, black level value 74 is recalculated with pixel values from a subsequent exposure of image sensor 15. Smear area generator 73 determines a smear area based on the pixel values of the previous exposure that resulted in the assertion of smear detect signal 63. When smear area generator 73 identifies pixel values from a subsequent exposure as being within a smear area, those pixel values can be immediately excluded from the recalculation of black level value 74 without delaying the input of pixel values using buffer 94. A register 95 in smear area generator 73 is programmable with a parameter that defines a band of transfer lines on either side of a transfer line with detected storage element overload. All pixel values from transfer lines within the band of transfer lines are then characterized as within the smear area and are excluded from the recalculation of black level value 74.

Although the present invention has been described in connection with certain specific embodiments for instructional purposes, the present invention is not limited thereto. The smear detect circuitry disclosed above detects storage element overload in a digital still camera. In other embodiments, however, the smear detect circuitry detects storage element overload in digital video cameras. Smear detect circuitry is described above as detecting smear in pixel data from an image sensor that senses four colors. In other embodiments, smear detect circuitry detects smear in pixel data from multiple image sensors, wherein each image sensor senses light of a different color. Accordingly, various modifications, adaptations, and combinations of various features of the described embodiments can be practiced without departing from the scope of the invention as set forth in the claims.

What is claimed is:

1. An integrated circuit comprising:
a plurality of leads, a sequence of black area pixel values being present on the plurality of leads; and
smear detect circuitry that receives the sequence of black area pixel values, compares each black area pixel value to a predetermined threshold value, and outputs a smear detect signal with an initial first digital value, wherein the smear detect signal changes from the first digital value to a second digital value when a first predetermined number of consecutive black area pixel values exceed the predetermined threshold value, wherein the smear detect signal changes from the second digital value to the first digital value when a second predetermined number of consecutive black area pixel values are below the predetermined threshold value, wherein the smear detect signal otherwise remains unchanged, and wherein the first predetermined number is at least two.

2. The integrated circuit of claim 1, wherein the integrated circuit is coupled to an image sensor, the image sensor includes a transfer line and a black area, and the smear detect signal indicates that a charge has leaked along the transfer line and into the black area.

3. The integrated circuit of claim 1, wherein the integrated circuit is an analog front end (AFE) integrated circuit of a digital camera.

4. The integrated circuit of claim 1, further comprising:
a black level generator that receives the smear detect signal and outputs a black level value.

5. The integrated circuit of claim 4, wherein the black level generator is disabled when the smear detect signal is asserted.

6. The integrated circuit of claim 4, further comprising:
a plurality of calibration registers, wherein each one of the calibration registers stores a corresponding one of a plurality of reference values based on the black level value.

7. The integrated circuit of claim 4, wherein the black level generator comprises a buffer, the buffer stores the first predetermined number of black area pixel values such that the black level value is calculated with a delay of the first predetermined number of black area pixel values.

8. The integrated circuit of claim 1, wherein the smear detect circuitry comprises:
a comparator that compares the sequence of black area pixel values and the threshold value and outputs a logic signal; and
a state machine that receives the logic signal and in response outputs the smear detect signal.

9. The integrated circuit of claim 8, wherein the state machine includes a finite number of at least three states.

10. The integrated circuit of claim 8, wherein the state machine further receives a value indicative of the first predetermined number.

11. The integrated circuit of claim 1, wherein the threshold value is programmable to correspond to an average black area pixel value without smear leakage.

12. The integrated circuit of claim 1, wherein the integrated circuit is part of a digital camera that produces a digital image, wherein the digital image is stored in the digital camera as a digital file, and wherein information from the smear detect signal is included in the digital file.

13. An integrated circuit comprising:
a plurality of leads, a sequence of black area pixel values being present on the plurality of leads; and
means for outputting a smear detect signal in response to detecting smear resulting from a charge leaking along a transfer line of an image sensor and into a black area of the image sensor, wherein the smear detect signal is asserted when a threshold value is exceeded by more than a first predetermined number of consecutive adjacent black area pixel values, wherein the smear detect signal is deasserted when a second predetermined number of consecutive adjacent black area pixel values are less than the threshold value, wherein the smear detect signal otherwise remains unchanged, and wherein the first predetermined number is at least two.

14. A method comprising:
(a) detecting a leakage charge that leaks from a first storage element located along a transfer line to a plurality of storage elements located along the transfer line within an optical black area of an image sensor, wherein the leakage charge is detected when an amount of charge stored on each of a first predetermined number of consecutive adjacent one of the plurality of storage elements exceeds a threshold amount, wherein the leakage charge is undetected when an amount of change stored on each of a second predetermined number of consecutive adjacent one of the plurality of storage elements is below the threshold amount, wherein the leakage charge detection otherwise remains unchanged, and wherein the first predetermined number is at least two; and
(b) identifying the transfer line as exhibiting the leakage charge.

15. The method of claim 14, wherein the image sensor is a charge coupled device in an analog front end (AFE) of a digital camera.

16. The method of claim 14, further comprising:
(c) indicating that the leakage charge has leaked.

17. The method of claim 16, wherein the image sensor is a charge coupled device in a digital camera, wherein the digital camera has a display, and wherein the leakage charge is indicated in (c) by displaying an icon on the display of the digital camera.

18. The method of claim 16, wherein the image sensor is part of a digital camera that produces a digital image, wherein the digital image is stored in the digital camera as a file with a filename, and wherein the leakage charge is indicated in (c) by including a code in the filename of the digital image.

19. The method of claim 14, wherein each storage element stores an amount of charge, wherein pixel data includes the amount of charge stored on each storage element, further comprising:
(c) performing black level calibration of the pixel data, wherein pixel data from the transfer line is excluded from the black level calibration when the leakage charge remains detected.

20. The method of claim 19, wherein the black level calibration is performed with a delay of the first predetermined number of consecutive ones of the plurality of storage elements.

21. The method of claim 14, wherein the image sensor includes a second transfer line adjacent to the first-mentioned transfer line, wherein a second plurality of storage elements are located along the second transfer line, wherein pixel data includes the amount of charge stored on each of the second plurality of storage elements located along the second transfer line, further comprising:
(c) performing black level calibration of the image sensor, wherein pixel data from the second transfer line is excluded from the black level calibration when the leakage charge remains detected.

* * * * *

UNITED STATES PATENT AND TRADEMARK OFFICE
CERTIFICATE OF CORRECTION

PATENT NO.       : 7,586,527 B2
APPLICATION NO.  : 11/031710
DATED            : September 8, 2009
INVENTOR(S)      : Yasunori Noguchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Fourteenth Day of September, 2010

David J. Kappos
*Director of the United States Patent and Trademark Office*